United States Patent
Kanai et al.

(10) Patent No.: US 12,101,124 B2
(45) Date of Patent: Sep. 24, 2024

(54) TRANSMISSION SYSTEM, TRANSMISSION METHOD, AND COMMUNICATION SYSTEM

(71) Applicant: NIPPON TELEGRAPH AND TELEPHONE CORPORATION, Tokyo (JP)

(72) Inventors: Takuya Kanai, Musashino (JP); Shin Kaneko, Musashino (JP); Kazuaki Honda, Musashino (JP); Junichi Kani, Musashino (JP); Hiroo Suzuki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 33 days.

(21) Appl. No.: 17/919,595

(22) PCT Filed: Apr. 24, 2020

(86) PCT No.: PCT/JP2020/017751
§ 371 (c)(1),
(2) Date: Oct. 18, 2022

(87) PCT Pub. No.: WO2021/214996
PCT Pub. Date: Oct. 28, 2021

(65) Prior Publication Data
US 2023/0170999 A1    Jun. 1, 2023

(51) Int. Cl.
*H04B 10/516*    (2013.01)
*H04J 14/00*    (2006.01)

(52) U.S. Cl.
CPC ............ *H04B 10/516* (2013.01); *H04J 14/00* (2013.01)

(58) Field of Classification Search
CPC ............... H04B 10/516; H04B 10/077; H04B 10/0775; H04B 10/0777; H04B 10/075;
(Continued)

(56) References Cited

U.S. PATENT DOCUMENTS 6,331,792 B1    12/2001 Tonietto
6,909,853 B1    6/2005 Yamashita
(Continued)

FOREIGN PATENT DOCUMENTS

JP    10-229384 A    8/1998
JP    2001077792 A  *  3/2001
(Continued)

OTHER PUBLICATIONS

K. Honda et al., "WDM Passive Optical Network Managed with Embedded Pilot Tone for Mobile Fronthaul", ECOC2015, We.3.4.4, 2015.
(Continued)

*Primary Examiner* — Hibret A Woldekidan
(74) *Attorney, Agent, or Firm* — Harness, Dickey & Pierce, P.L.C.

(57) ABSTRACT

An aspect of the present disclosure is a transmission system including a modulated wave generation unit that generates an intermediate wave, which is a coherent wave in which a frequency component of either of two signals overlays a frequency spectrum, the two signals being a main signal indicating transmitted information to be transmitted and a control signal indicating management information, which is information on communication between a transmission source of the transmitted information and a communication destination of the transmission source, and a modulation unit that modulates the intermediate wave with a signal in which a frequency component does not overlay the frequency spectrum of the coherent wave generated by the modulated wave generation unit out of the two signals that are the main signal and the control signal. In the transmission system, a frequency band of the main signal and a frequency band of the control signal do not overlap each other.

7 Claims, 11 Drawing Sheets

(58) Field of Classification Search
CPC ............. H04B 10/073; H04B 10/0731; H04B 10/272; H04B 10/2914; H04B 10/50; H04B 10/5161; H04B 10/54; H04B 10/548; H04B 10/5563; H04J 14/00; H04J 14/02

See application file for complete search history.

(56) References Cited

U.S. PATENT DOCUMENTS

| | | |
|---|---|---|
| 7,519,300 B2 | 4/2009 | Ohtani et al. |
| 2006/0110162 A1 | 5/2006 | Tian et al. |
| 2013/0071104 A1 | 3/2013 | Nakashima et al. |
| 2016/0285582 A1 | 9/2016 | Kato et al. |

FOREIGN PATENT DOCUMENTS

| | | |
|---|---|---|
| JP | 2006-148922 A | 6/2006 |
| JP | 2006197489 A | 7/2006 |
| JP | 2013070123 A | 4/2013 |
| JP | 2016-184896 A | 10/2016 |
| WO | WO-2017104075 A1 * | 6/2017 |

OTHER PUBLICATIONS

Goji Nakagawa et al., "Development of evaluation platform of AMCC superimposition on CPRI signal transmission for mobile fronthaul network", 2017 European Conference on Optical Communication (ECOC), Sep. 2017.

Goji Nakagawa et al., "Compact and low cost superimposition of AMCC with magneto-optic VOA", 2017 Optical Fiber Communications Conference and Exhibition (OFC), Mar. 2017.

K. Sato et al., "Reduction of Mode Partition Noise by Using Semiconductor Optical Amplifiers", IEEE Journal of Selected Topics in Quantum Electronics, vol. 7, No. 2, pp. 328-333, 2001.

* cited by examiner

TRANSMISSION SYSTEM, TRANSMISSION METHOD, AND COMMUNICATION SYSTEM

CROSS-REFERENCE TO RELATED APPLICATIONS

This application is a 371 U.S. National Phase of International Application No. PCT/JP2020/017751, filed on Apr. 24, 2020. The entire disclosure of the above application is incorporated herein by reference.

TECHNICAL FIELD

The present disclosure relates to a transmission system, a transmission method, and a communication system.

BACKGROUND ART

In recent years, opportunities to transmit and receive large amounts of data of video streaming, electronic sports, or the like have increased. One technique for supporting the transmission and reception of such large amounts of data is a technique for optical communication. In the optical communication, a main signal overlays a control signal in a state of an electrical signal, the electrical signal after overlaying is converted into an optical signal, and the converted optical signal is transmitted to a transmission destination (NPL 1).

The main signal is a signal indicating information itself to be transmitted by a user, and the control signal is information on a situation including a communication wavelength, a light intensity of the optical signal, and a temperature when the main signal is transmitted.

CITATION LIST

Non Patent Literature

NPL 1: K. Honda et al., "WDM Passive Optical Network Managed with Embedded Pilot Tone for Mobile Fronthaul", ECOC2015, We. 3. 4. 4, 2015.

SUMMARY OF THE INVENTION

Technical Problem

However, the main signal overlays the control signal in a state of the electrical signal by using a signal mixer (see FIG. 12). Thus, the signal mixer needs to operate in a wide frequency band including a frequency band of the main signal and a frequency band of the control signal, and noise in a frequency band not used for communication between the frequency of the main signal and the frequency of the control signal may also be overlaid. This may deteriorate the signal to noise ratio (SNR) of the optical signal. Such a problem is found not only in the optical communication but also in communications using, as a carrier wave, an electromagnetic wave for a satellite communication and the like using a microwave.

In view of the above circumstances, an object of the present disclosure is to provide a technique for suppressing deterioration of SNR of a signal in communication using an electromagnetic wave as a carrier wave.

Means for Solving the Problem

An aspect of the present disclosure is a transmission system including a modulated wave generation unit that generates an intermediate wave, which is a coherent wave in which a frequency component of either of two signals overlays a frequency spectrum, the two signals being a main signal indicating transmitted information to be transmitted and a control signal indicating management information, which is information on communication between a transmission source of the transmitted information and a communication destination of the transmission source, and a modulation unit that modulates the intermediate wave with a signal in which a frequency component does not overlay the frequency spectrum of the coherent wave generated by the modulated wave generation unit out of the two signals that are the main signal and the control signal. In the transmission system, a frequency band of the main signal and a frequency band of the control signal do not overlap each other.

Effects of the Invention

The present disclosure allows for suppressing deterioration of SNR of a signal in communication using an electromagnetic wave as a carrier wave.

DESCRIPTION OF EMBODIMENTS

First Embodiment

Figure 1:
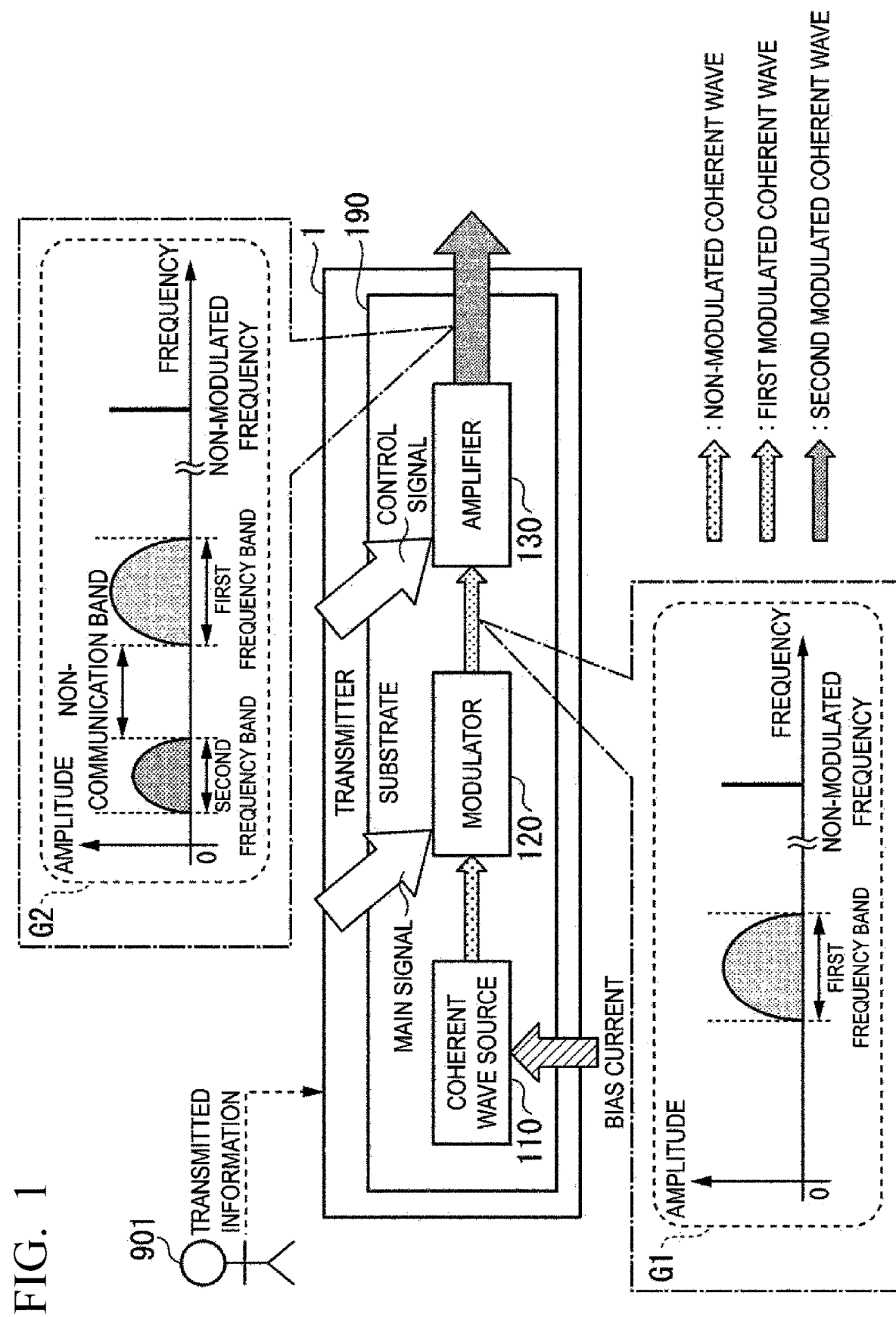
FIG. 1 is an explanatory diagram describing an outline of a transmitter according to a first embodiment.

FIG. 1 is an explanatory diagram describing an outline of a transmitter 1 according to a first embodiment. The transmitter 1 generates an electromagnetic wave signal indicating information desired by a sender 901 to transmit to a communication partner (hereinafter referred to as "transmitted information"). The transmitter 1 emits the generated electromagnetic wave signal. The emitted electromagnetic wave signal is incident on a transmission line such as an optical fiber and propagates through the transmission line.

The transmitter 1 includes a coherent wave source 110, a modulator 120, and an amplifier 130. The coherent wave source 110, the modulator 120, and the amplifier 130 are located on a substrate 190.

The coherent wave source 110 generates an unmodulated and continuous coherent wave (hereinafter referred to as "non-modulated coherent wave") having a frequency in a frequency band used for communication (hereinafter referred to as "optical communication frequency band"). The coherent wave is a coherent electromagnetic wave. Thus, the non-modulated coherent wave generated by the coherent wave source 110 is not a pulse signal. The coherent wave is, for example, a laser. The coherent wave may be a maser. For the sake of simplicity, the transmitter 1 will be described below in an example where the coherent wave is a laser.

The coherent wave source 110 may be any source capable of generating a non-modulated coherent wave. The coherent wave source 110 is, for example, a semiconductor laser. The semiconductor laser may be a distributed feedback (DFB) laser, a fabry-perot (FP) laser, or a distributed bragg reflector (DBR) laser. For the sake of simplicity, the transmitter 1 will be described in an example where the coherent wave source 110 is a semiconductor laser.

The coherent wave source 110 oscillates when a bias current, which is a constant or higher current, is applied, and outputs a non-modulated coherent wave. The non-modulated coherent wave output by the coherent wave source 110 propagates to the modulator 120.

The non-modulated coherent wave is incident on the modulator 120. The modulator 120 is applied, as a main signal, with an electrical signal having an amplitude or a phase changing over time (hereinafter referred to as a "modulator applied signal"). In the main signal, the transmitted information is represented by the amplitude or the phase of the modulator applied signal. Thus, the main signal is an electrical signal representing the transmitted information. The electrical signal may be a temporal change in voltage or a temporal change in current.

The modulator 120 executes main signal overlay processing. The main signal overlay processing is processing of generating a coherent wave whose waveform is overlaid by a waveform of the main signal. More specifically, the main signal overlay processing is processing of generating a coherent wave in which a frequency component of the main signal overlays a frequency spectrum. The modulator 120 executes the main signal overlay processing to generate a coherent wave in which the waveform of the main signal overlays a waveform of a non-modulated coherent wave (hereinafter referred to as "first modulated coherent wave").

The first modulated coherent wave is a coherent wave overlaid by the waveform of the main signal and has a frequency component in the frequency band of the main signal (hereinafter referred to as "first frequency band"). The first modulated coherent wave is a coherent wave overlaid by the waveform of the main signal and is an electromagnetic wave signal transmitting the transmitted information. The electromagnetic wave signal is a signal having a carrier wave being an electromagnetic wave. The electromagnetic wave signal is, for example, an optical signal. The modulator 120 emits the first modulated coherent wave. The first modulated coherent wave emitted by the modulator 120 propagates to the amplifier 130.

A graph G1 in FIG. 1 shows one example of a distribution, on a frequency axis, of an amplitude indicated by the frequency spectrum of the first modulated coherent wave. The first frequency band is lower than the frequency of the non-modulated coherent wave (hereinafter referred to as "non-modulated frequency"). The first frequency band is, for example, a band equal to or more than 10 GHz and less than a non-modulated frequency.

The main signal overlay processing executed by the modulator 120 will be specifically described. The modulator 120 modulates the non-modulated coherent wave with the main signal to generate the first modulated coherent wave. When the non-modulated coherent wave is modulated with the main signal, the modulation in response to a change in amplitude or phase of the main signal is executed on the non-modulated coherent wave. Thus, the first modulated coherent wave has a frequency spectrum having the frequency component included in the main signal overlaid by the frequency spectrum of the non-modulated coherent wave.

The modulator 120 may be any modulator capable of executing the main signal overlay processing. For example, a Mach-Zehnder modulator or an electroabsorption modulator may be employed for the modulator 120. It is also desirable that the modulator 120 is fabricated (integrated) on the same substrate as the coherent wave source. For example, the modulator 120 may be a modulator fabricated on an indium phosphide substrate.

Note that the main signal applied to the modulator 120 may be a signal transmitted through a filter that removes a noise component on the frequency axis (hereinafter referred to as "main signal filter").

The first modulated coherent wave is incident on the amplifier 130. The amplifier 130 is applied, as the control signal, with an electrical signal having an amplitude or a phase changing over time (hereinafter referred to as "amplifier applied signal"). In the control signal, the management information is represented by the amplitude or the phase of the modulator applied signal. Thus, the control signal is an electrical signal representing the management information. The management information is information on communication between a transmission source of the transmitted information and a communication destination of the transmission source. Thus, the management information is information on communication between the sender 901 and the communication partner, for example. The management information is information indicating, for example, a wavelength of the first modulated coherent wave, a light intensity, an operating temperature of the transmitter 1, and the communication partner. The management information may include a transmission speed (bit rate) of a signal to be transmitted, a modulation scheme (an intensity modulation, a phase modulation, a frequency modulation, and the like), and connection destination information to be connected subsequently, for example.

The amplifier 130 executes control signal overlay processing. The control signal overlay processing is processing of generating a coherent wave in which a waveform of the control signal overlays a waveform. More specifically, the control signal overlay processing is processing of generating a coherent wave in which a frequency component of the control signal overlays a frequency spectrum. The amplifier 130 executes the control signal overlay processing to generate a coherent wave in which the waveform of the control signal overlays a waveform of the first modulated coherent wave (hereinafter referred to as "second modulated coherent wave"). The amplifier 130 emits the second modulated coherent wave. However, when transmission of the control signal is not necessary, the amplifier applied signal applied to the amplifier 130 may be a current having a constant value and not overlaid by the control signal.

The second modulated coherent wave, which is a coherent wave overlaid by the waveform of the control signal, has a frequency component in the frequency band of the control signal (hereinafter referred to as "second frequency band"). The second frequency band is a frequency band not overlapping on the first frequency band.

The first frequency band and the second frequency band are different in frequency band, and thus, the transmitted information provided in the first modulated coherent wave will not be lost by the control signal overlay processing. Thus, the second modulated coherent wave, which is the first modulated coherent wave overlaid by the waveform of the control signal, is an optical signal indicating the transmitted information and the management information.

A graph G2 in FIG. 1 shows one example of a distribution, on a frequency axis, of an amplitude indicated by the frequency spectrum of the second modulated coherent wave. The second frequency band is lower than the non-modulated frequency. The second frequency band is lower than the first frequency band, as shown in the graph G2, for example. The second frequency band is, for example, a band less than 1 MHz.

The first frequency band and the second frequency band are frequency bands not overlapping on each other, and thus, between a first type wave number band and the second frequency band, there is a frequency band (hereinafter referred to as "non-communication band") that is neither the first type wave number band nor the second frequency band. The transmitter 1 executes the main signal overlay processing and the control signal overlay processing, and thus, the magnitude of a spectral component of the non-communication band of the second modulated coherent wave is approximately zero. This means that the noise in the non-communication band provided in the second modulated coherent wave is approximately zero.

The control signal overlay processing executed by the amplifier 130 will be described more specifically. In the control signal overlay processing, the amplifier 130 amplifies the first modulated coherent wave with an amplification factor corresponding to one of or both the amplitude and the phase of the control signal. The amplification by the amplifier 130 causes the frequency component of the control signal to overlay the frequency spectrum of the first modulated coherent wave.

The amplifier 130 may be any amplifier capable of executing the control signal overlay processing. The amplifier 130 is, for example, a semiconductor optical amplifier (SOA).

Note that the control signal applied to the amplifier 130 may be a signal transmitted through a filter that removes a noise component on the frequency axis (hereinafter referred to as "control signal filter").

For the sake of simplicity, the transmitter 1 will be described below in an example where the coherent wave source 110 is a semiconductor laser, the modulator 120 is an electroabsorption modulator, and the amplifier 130 is a SOA.

Figure 2:
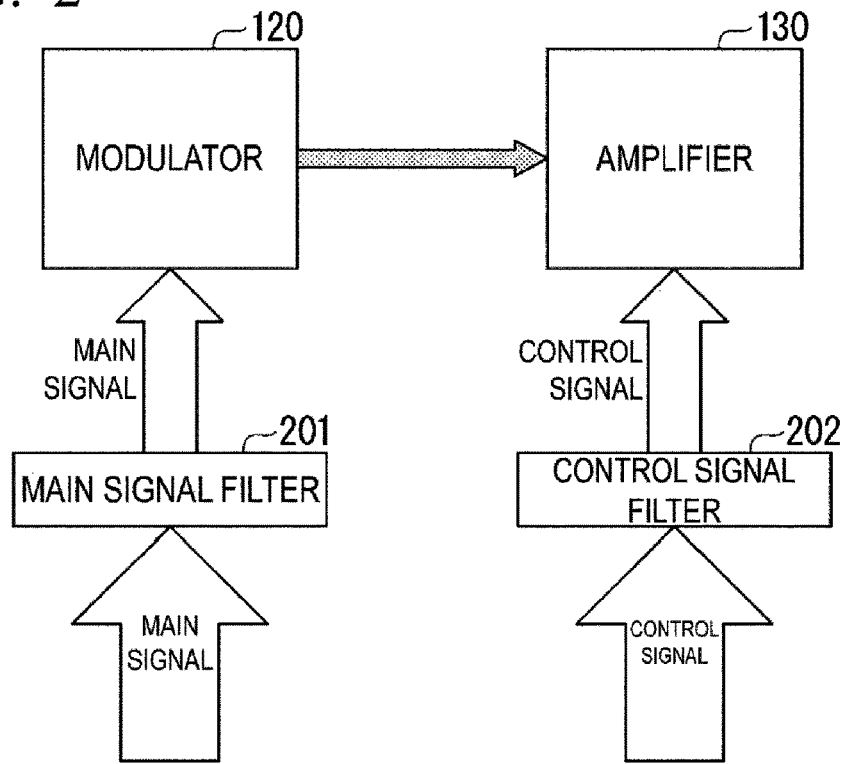
FIG. 2 is a diagram illustrating a main signal filter and a control signal filter according to the first embodiment.

FIG. 2 is a diagram illustrating the main signal filter and the control signal filter according to the first embodiment.

A main signal filter 201 in FIG. 2 is one example of the main signal filter, and a control signal filter 202 in FIG. 2 is one example of the control signal filter. The main signal transmitted through the main signal filter 201 is applied to the modulator 120 with the noise component on the frequency axis being removed. The control signal transmitted through the control signal filter 202 is applied to the amplifier 130 with the noise component on the frequency axis being removed.

Figure 3:
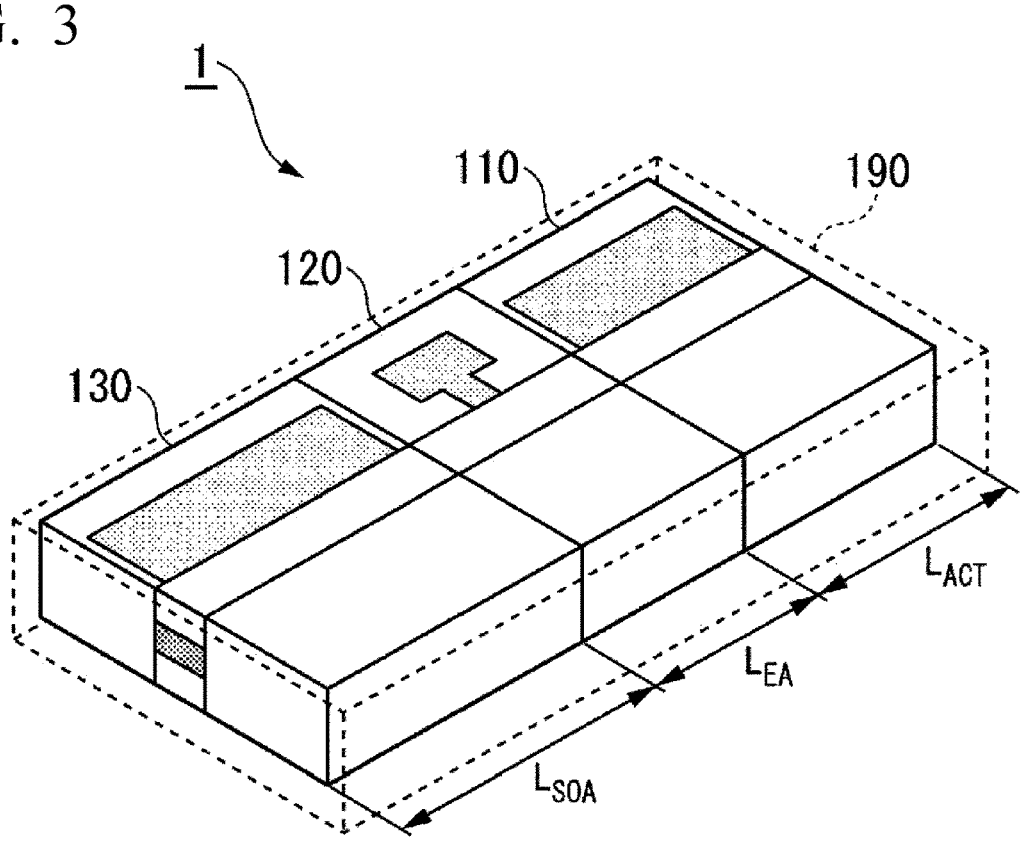
FIG. 3 is a diagram illustrating one example of a bird's-eye view of the transmitter according to the first embodiment.

FIG. 3 is one example of a perspective view of the transmitter 1 according to the first embodiment, in which the coherent wave source 110 is a semiconductor laser, the modulator 120 is an electroabsorption modulator, and the amplifier 130 is a SOA. The modulator 120 is constructed by previously adjusting a pad size of an electrode, a length LEA in a propagation direction of the coherent wave, and the like so that it is possible to suitably execute the main signal overlay processing. The modulator 120 being constructed so as to suitably execute the main signal overlay processing specifically means that the modulator 120 is constructed so as to have a frequency characteristic suitable for executing the main signal overlay processing.

The amplifier 130 is constructed by adjusting a length $L_{SOA}$ in the propagation direction of the coherent wave so as not to respond to the electromagnetic wave in the first frequency band. The amplifier 130 is constructed by previously adjusting a pad size of an electrode, the length $L_{SOA}$, and the like so that it is possible to suitably execute the control signal overlay processing. The amplifier 130 being constructed so as to suitably execute the control signal overlay processing specifically means that the amplifier 130 is constructed so as to have a frequency characteristic suitable for executing the control signal overlay processing.

The coherent wave source 110 may have any configuration as long as the non-modulated coherent wave can be output, and for example, may be a coherent wave source having an adjusted length $L_{ACT}$ in the propagation direction of the coherent wave and an adjusted pad size of the electrode so as to enable direct modulation by a high frequency wave.

Note that the transmitter 1 illustrated in FIG. 3 is the transmitter 1 having a structure in which the coherent wave source 110, the modulator 120, and the amplifier 130 are embedded in the same substrate 190. However, the transmitter 1 may employ a ridge structure or a high mesa ridge structure so that the coherent wave source 110, the modulator 120, and the amplifier 130 are formed on the substrate 190.

Figure 4:
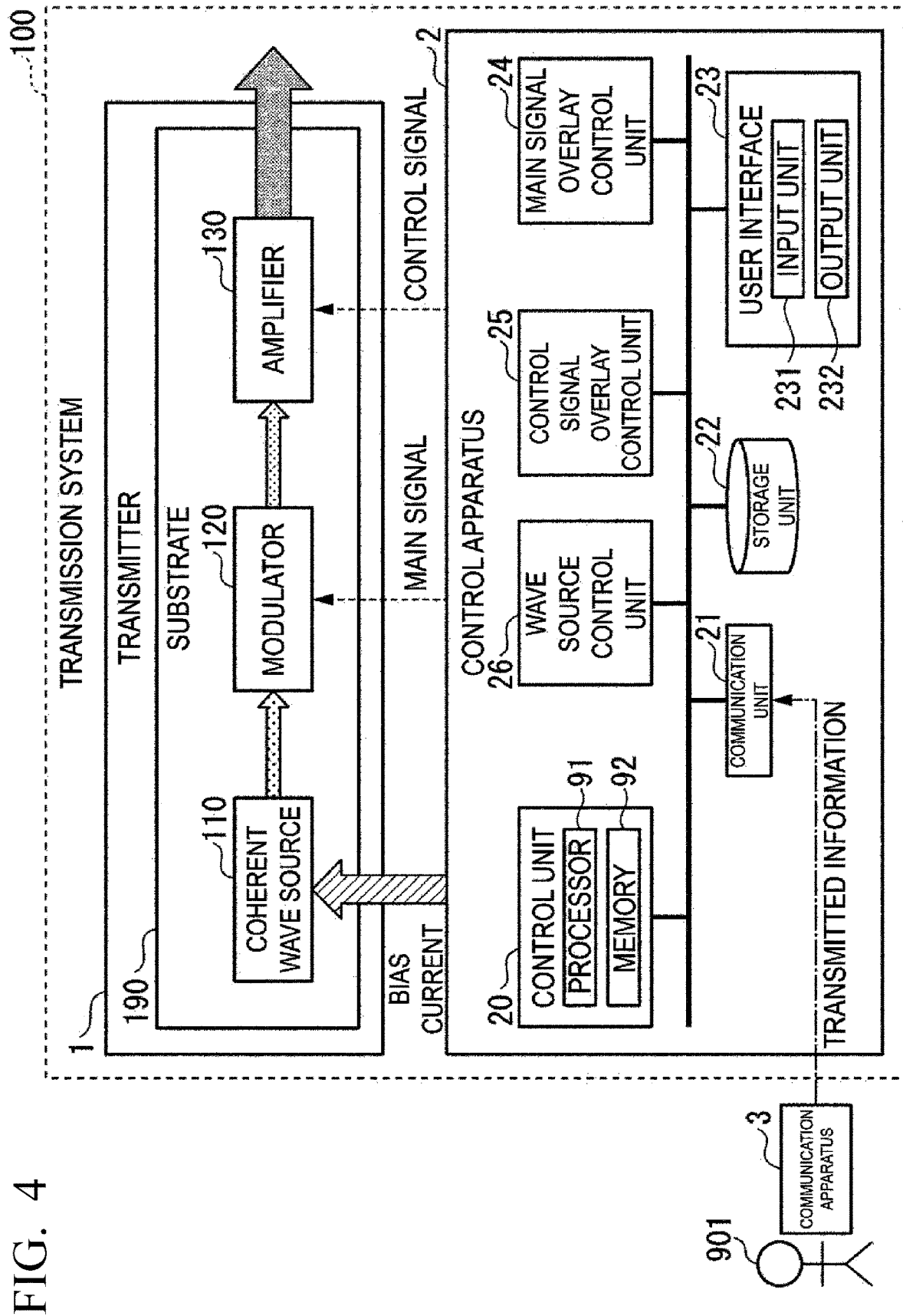
FIG. 4 is an explanatory diagram describing one example of a configuration of a transmission system according to the first embodiment.

FIG. 4 is an explanatory diagram describing one example of a configuration of a transmission system 100 according to the first embodiment. The transmission system 100 includes the transmitter 1 and a control apparatus 2. The control apparatus 2 controls an operation of the transmitter 1.

The control apparatus 2 executes bias application processing, main signal overlay control processing, and control signal overlay control processing. The bias application processing is processing of applying a bias current to the coherent wave source 110. The main signal overlay control processing is processing of controlling execution of the main signal overlay control processing of the transmitter 1. The control signal overlay control processing is processing of controlling execution of the control signal overlay control processing of the transmitter 1.

The control apparatus 2 includes a control unit 20 including a processor 91 such as a central processing unit (CPU), and a memory 92, and executes a program. When the program is executed, the control apparatus 2 functions as an apparatus including the control unit 20, a communication unit 21, a storage unit 22, a user interface 23, a main signal overlay control unit 24, a control signal overlay control unit 25, and a wave source control unit 26.

More specifically, in the control apparatus 2, the processor 91 reads a program stored in the storage unit 22, and stores the read program into the memory 92. When the processor 91 executes the program stored in the memory 92, the control apparatus 2 functions as an apparatus including the control unit 20, the communication unit 21, the storage unit 22, the user interface 23, the main signal overlay control unit 24, the control signal overlay control unit 25, and the wave source control unit 26.

The control unit 20 controls an operation of each function unit included in the control apparatus 2. The control unit 20 controls the operation of the communication unit 21, for example. The control unit 20 controls the operation of the main signal overlay control unit 24, for example. The control unit 20 controls the operation of the control signal overlay control unit 25, for example. The control unit 20 controls the operation of the wave source control unit 26, for example.

The communication unit 21 is configured to include a communication interface for connecting the control apparatus 2 to a communication apparatus 3. The communication apparatus 3 is an apparatus used by the sender 901 to input the transmitted information. The communication apparatus 3 is, for example, a personal computer. The communication apparatus 3 may be, for example, a smart phone. The communication unit 21 acquires the transmitted information input to the communication apparatus 3. The communication unit 21 may be configured to include a communication interface for connecting to an external apparatus that transmits the management information (hereinafter, referred to as "management information transmission source apparatus"). In such a case, the communication unit 21 acquires the management information transmitted by the management information transmission source apparatus. The management information transmission source apparatus is, for example, a personal computer or a server.

The storage unit 22 is configured using a storage device such as a magnetic hard disk device or a semiconductor storage device. The storage unit 22 stores various types of information related to the control apparatus 2. The storage unit 22 stores in advance, for example, a program for controlling the operation of each function unit included in the control apparatus 2. The storage unit 22 stores the management information. The management information stored in the storage unit 22 may be stored in advance in the storage unit 22 or may be acquired from the management information transmission source apparatus.

The user interface 23 includes an input unit 231 that receives an input to the control apparatus 2 and an output unit 232 that outputs various types of information related to the control apparatus 2. The user interface 23 is, for example, a touch panel. The input unit 231 receives an input to the control apparatus 2. The input unit 231 is, for example, an input terminal such as a mouse, a keyboard, or a touch panel. The input unit 231 may be configured as an interface for connecting the input terminal to the control apparatus 2, for example. The output unit 232 is, for example, a display apparatus such as a liquid crystal display and an organic EL display. The output unit 232 may be configured as an interface for connecting the display apparatus to the control apparatus 2, for example. The output unit 232 outputs the information input to the input unit 231, for example.

The transmitted information is not necessarily required to be input via the communication unit 21, and may be input by the sender 901 inputting to the input unit 231.

The main signal overlay control unit 24 executes the main signal overlay control processing. In the main signal overlay control processing, the main signal overlay control unit 24 specifically applies, to an application target, the main signal, which is an electrical signal indicating the transmitted information input to the communication unit 21 or the input unit 231. In the transmission system 100, the target applied with the main signal is the modulator 120. The main signal overlay control unit 24 controls an operation of the target applied with the main signal.

The control signal overlay control unit 25 executes the control signal overlay control processing. In the control signal overlay control processing, the control signal overlay control unit 25 specifically applies, to an application target, the control signal, which is an electrical signal indicating the management information. In the transmission system 100, the target applied with the control signal is the amplifier 130. The control signal overlay control unit 25 controls the operation of the target applied with the control signal.

The wave source control unit 26 executes the bias application processing. In the bias application processing, the wave source control unit 26 specifically applies a bias current to an application target. In the transmission system 100, the target applied with the bias current is the coherent wave source 110. The wave source control unit 26 controls the operation of the target applied with the bias current.

The main signal overlay control unit 24 starts the main signal overlay control processing, the control signal overlay control unit 25 starts the control signal overlay control processing, and the wave source control unit 26 starts the bias application processing, respectively, at the input timing of the transmitted information to the communication unit 21 and the input unit 231.

Figure 5:
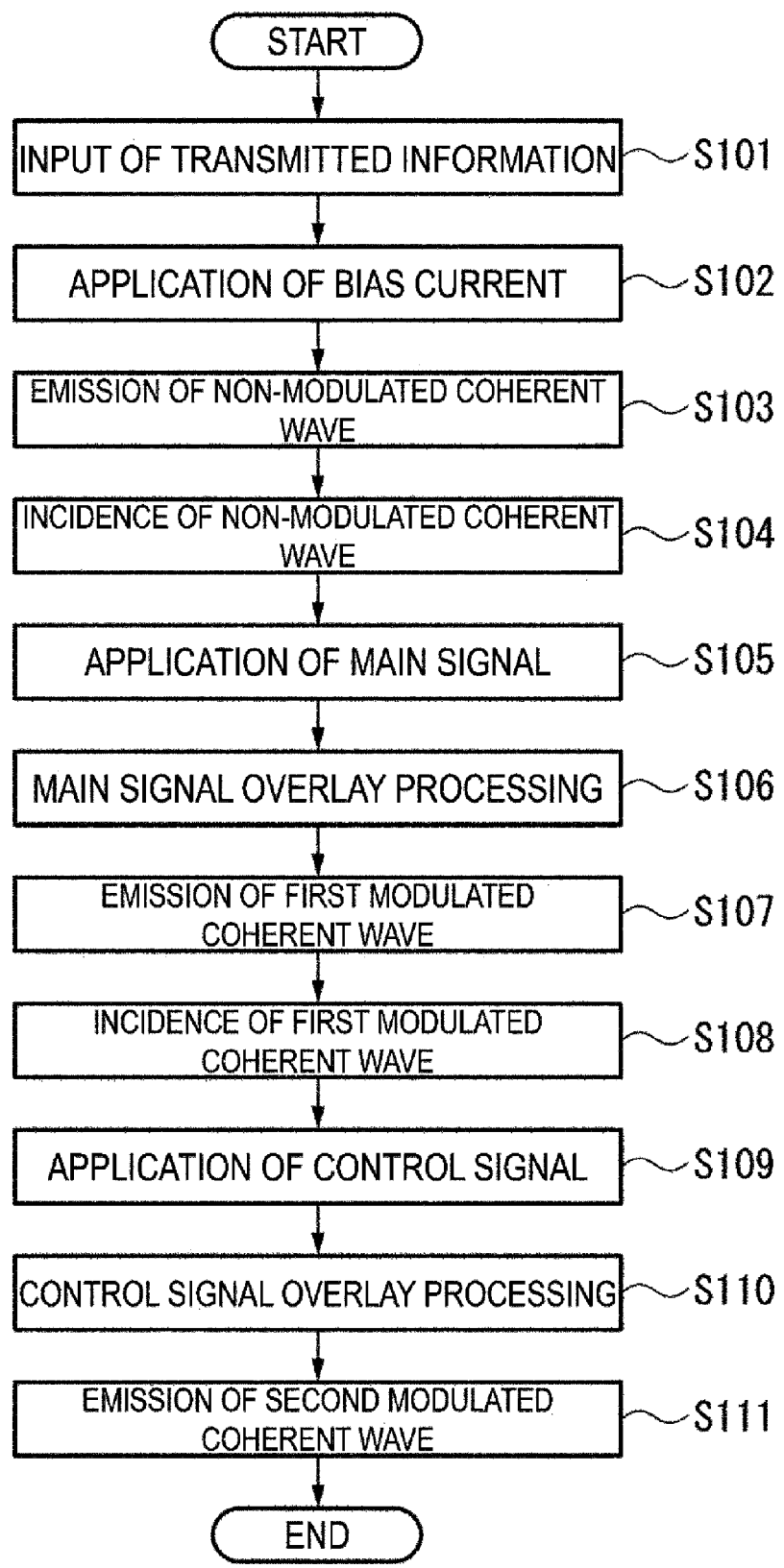
FIG. 5 is a flowchart illustrating one example of a flow of processing executed by a control apparatus according to the first embodiment.

FIG. 5 is a flowchart illustrating one example of a flow of processing executed by the control apparatus 2 according to the first embodiment. The transmitted information is input to the communication unit 21 or the input unit 231 (step S101). Next, the wave source control unit 26 applies the bias current to the coherent wave source 110 (step S102). Next, the coherent wave source 110 applied with the bias current emits the non-modulated coherent wave (step S103). Next, the non-modulated coherent wave is incident on the modulator 120 (step S104). Next, the main signal overlay control unit 24 applies the main signal to the modulator 120 (step S105). The application of the main signal causes the main signal overlay processing to be executed on the non-modulated coherent wave (step S106). The non-modulated coherent wave performed thereon with the main signal overlay processing in step S106 is the first modulated coherent wave. Next, the modulator 120 emits the first modulated coherent wave (step S107).

Next, a first coherent wave is incident on the amplifier 130 (step S108). Next, the control signal overlay control unit 25 applies the control signal to the amplifier 130 (step S109). The application of the control signal causes the control signal overlay processing to be executed on the first modulated coherent wave (step S110). The first modulated coherent wave performed thereon with the control signal overlay processing in step S110 is the second modulated coherent wave. Note that when the control signal overlay processing is executed in step S110, the number of photons is amplified. After step S110, the amplifier 130 emits the second modulated coherent wave (step S111).

The thus-configured transmitter 1 according to the first embodiment modulates the coherent wave without superimposing the main signal and the control signal. Thus, the transmitter 1 is capable of suppressing deterioration of the SNR of a signal in communication using an electromagnetic waves as a carrier wave.

Note that in a case where the main signal is a signal transmitted through the main signal filter, the noise component of the main signal is suppressed, and thus, compared to a case where the main signal does not pass through the main signal filter, the transmitter 1 is capable of further suppressing deterioration of the SNR in communication.

Note that in a case where the control signal is a signal transmitted through the control signal filter, the noise component of the control signal is suppressed, and thus, compared to a case where the control signal does not pass through the control signal filter, the transmitter 1 is capable of further suppressing deterioration of the SNR in communication.

Second Embodiment

Figure 6:
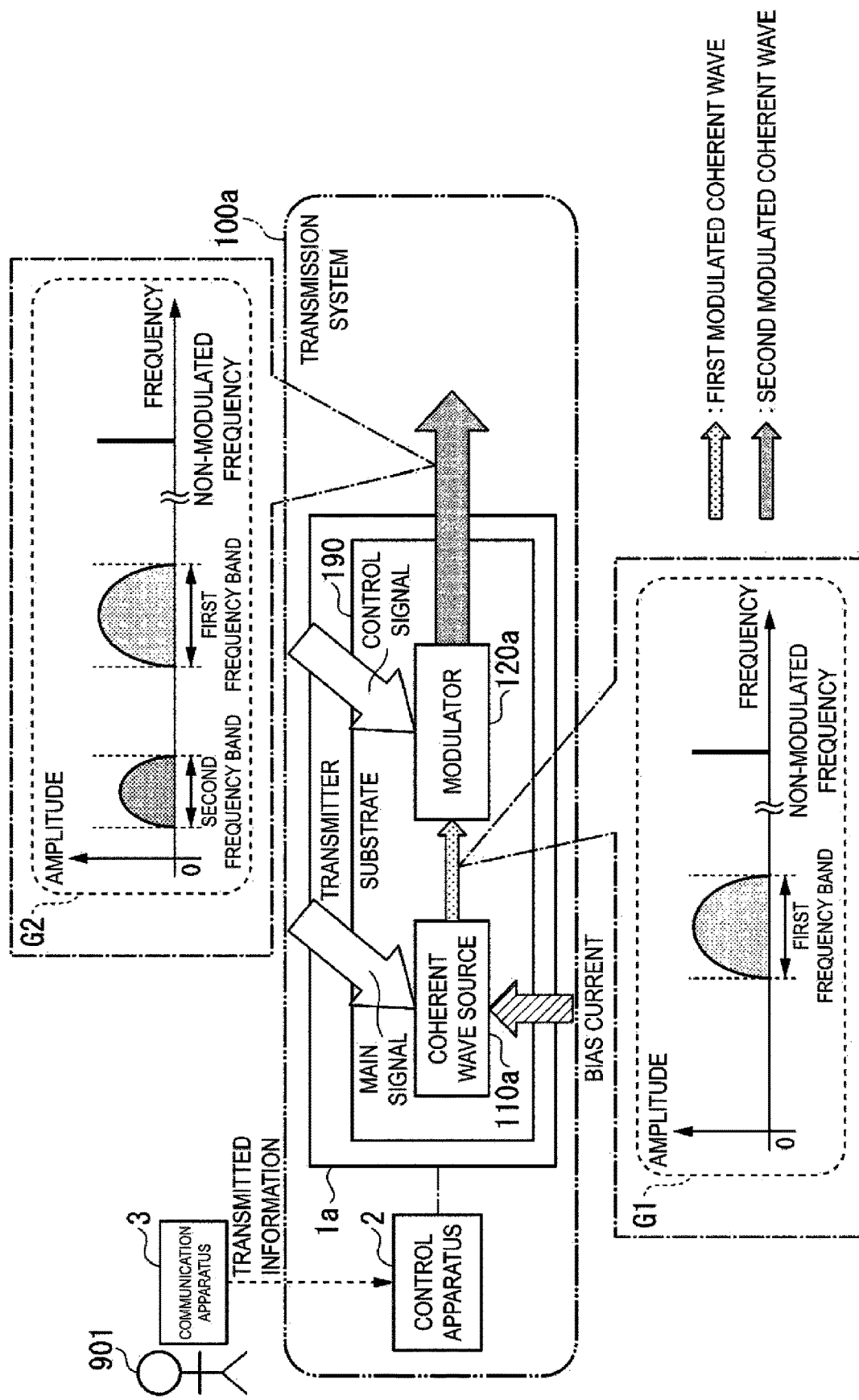
FIG. 6 is an explanatory diagram describing a transmission system according to a second embodiment.

FIG. 6 is an explanatory diagram describing a transmission system 100*a* according to a second embodiment. The transmission system 100*a* differs from the transmission system 100 in that the former includes a transmitter 1*a* instead of the transmitter 1. The transmitter 1*a* differs from the transmitter 1 in that the former does not include the amplifier 130, includes a coherent wave source 110*a* instead of the coherent wave source 110, and includes a modulator 120*a* instead of the modulator 120. Hereinafter, the same reference signs as those in FIG. 1 or FIG. 4 will be applied to components having similar functions to those of the function units provided in the transmission system 100, and description thereof will be omitted.

The coherent wave source 110*a* differs from the coherent wave source 110 in that the former is applied with not only the bias current but also the main signal and generates the first modulated coherent wave by executing the main signal overlay processing with the bias current being applied to the coherent wave source 110*a*. The coherent wave source 110*a* emits the first modulated coherent wave. The coherent wave source 110*a* may be any coherent wave source capable of generating the first modulated coherent wave by executing the main signal overlay processing with the bias current being applied to the coherent wave source 110*a*. The coherent wave source 110*a* is, for example, a semiconductor laser.

The modulator 120*a* differs from the modulator 120 in that the former is applied with the control signal instead of the main signal and executes the control signal overlay processing instead of the main signal overlay processing. The first modulated coherent wave is incident on the modulator 120*a*. The modulator 120*a* executes the control signal overlay processing on the incident first modulated coherent wave to generate the second modulated coherent wave.

Specifically, in the control signal overlay processing, the modulator 120*a* modulates the incident first modulated coherent wave with the control signal to generate the second modulated coherent wave.

The modulator 120*a* emits the second modulated coherent wave. The modulator 120*a* may be any modulator capable of executing the control signal overlay processing on the first modulated coherent wave. The modulator 120*a* may be a Mach-Zehnder modulator, may be an electroabsorption modulator, and may be a SOA, for example. Furthermore, the modulator 120*a* may be integrated on the same substrate (such as an indium phosphide substrate) as the coherent wave source.

The operation of the transmitter 1*a* is controlled by the control apparatus 2. In the transmission system 100*a*, a target to be applied with the main signal by the main signal overlay control unit 24 is the coherent wave source 110*a*. In the transmission system 100*a*, a target to be applied with the control signal by the control signal overlay control unit 25 is the modulator 120*a*. When the control signal is applied to the modulator 120*a*, a control signal filter allowing only the electrical signal in the second frequency band to pass may be employed for the control signal filter.

Specifically, the control signal filter allowing only the electrical signal in the second frequency band to pass is a bandpass filter through which only the electrical signal in the second frequency band passes. In this case, the modulator 120*a* is applied with the control signal having transmitted through the control signal filter.

If the structure of the modulator 120*a* is controlled when the modulator 120*a* is fabricated, the modulator 120*a* may be fabricated to have a frequency response characteristic that an electrical signal on a high frequency side relative to the second frequency band is not transmitted. In such a case also, the noise component included in the control signal is reduced.

The thus-configured transmitter 1*a* according to the second embodiment modulates the coherent wave without superimposing the main signal and the control signal. Thus, the transmitter 1*a* is capable of suppressing deterioration of the SNR of a signal in communication using an electromagnetic waves as a carrier wave.

Note that in a case where the control signal is a signal transmitted through the control signal filter, the noise component of the control signal is suppressed, and thus, compared to a case where the control signal does not pass through the control signal filter, the transmitter 1*a* is capable of further suppressing deterioration of the SNR in communication.

Third Embodiment

Figure 7:
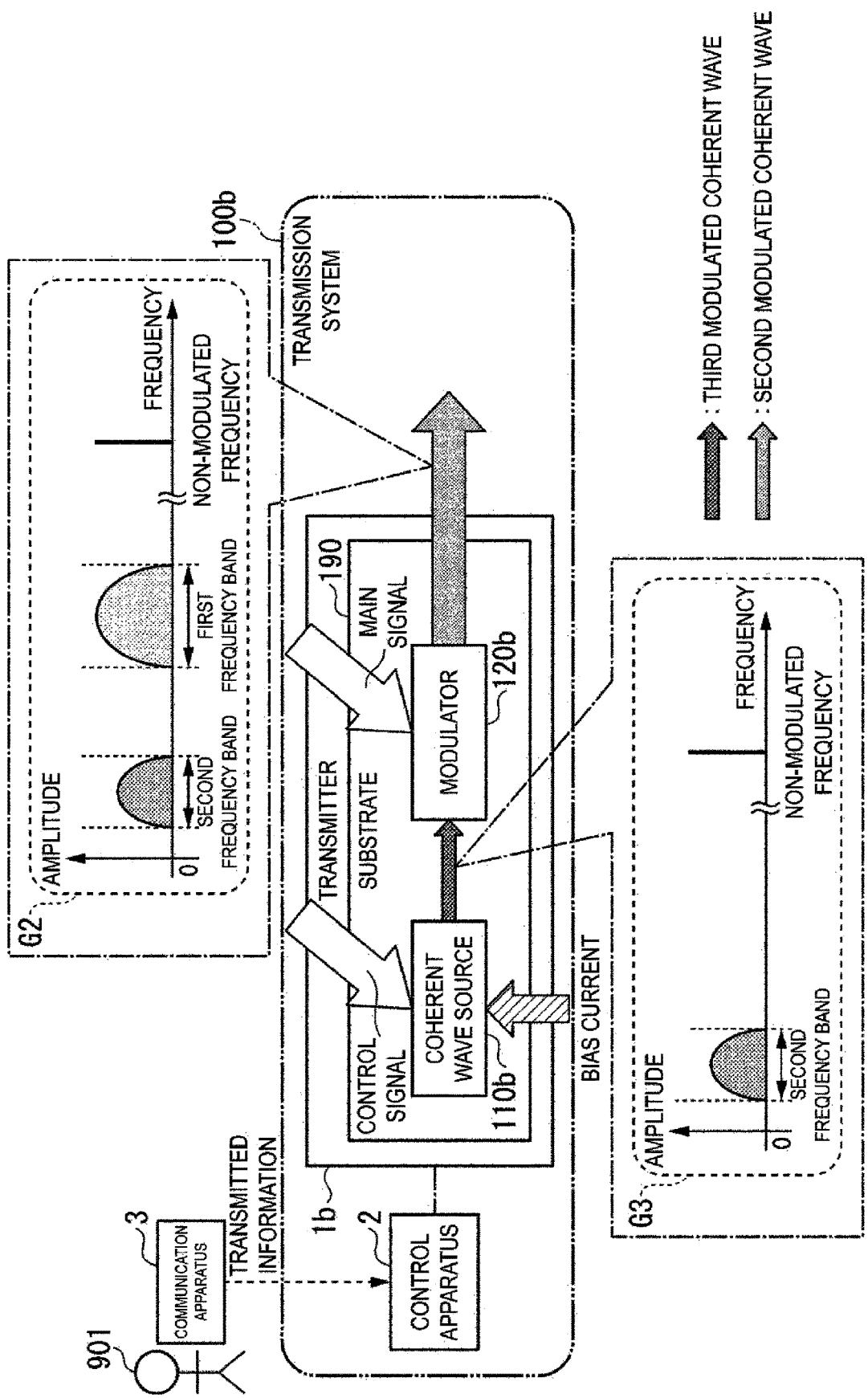
FIG. 7 is an explanatory diagram describing a transmission system according to a third embodiment.

FIG. 7 is an explanatory diagram describing a transmission system 100*b* according to a third embodiment. The transmission system 100*b* differs from the transmission system 100 in that the former includes a transmitter 1*b* instead of the transmitter 1. The transmitter 1*b* differs from the transmitter 1 in that the former does not include the amplifier 130, includes a coherent wave source 110*b* instead of the coherent wave source 110, and includes a modulator 120*b* instead of the modulator 120. Hereinafter, the same reference signs as those in FIG. 1 or FIG. 4 will be applied to components having similar functions to those of the function units provided in the transmission system 100, and description thereof will be omitted.

The coherent wave source 110*b* generates a third modulated coherent wave by executing the control signal overlay processing with the bias current being applied to the coherent wave source 110*b*. The coherent wave source 110*b* emits the third modulated coherent wave. The coherent wave source 110*b* may be any coherent wave source capable of generating the third modulated coherent wave by executing the control signal overlay processing with the bias current being applied to the coherent wave source 110*b*. The coherent wave source 110*b* is, for example, a semiconductor laser. When the control signal is applied to the coherent wave source 110*b*, a control signal filter allowing only the electrical signal in the second frequency band to pass may be employed for the control signal filter.

Specifically, the control signal filter through which only the electrical signal in the second frequency band passes is a bandpass filter allowing only the electrical signal in the second frequency band to pass. In this case, the coherent wave source 110*b* is applied with the control signal having transmitted through the control signal filter.

If the structure of the coherent wave source 110*b* is controlled when the coherent wave source 110*b* is fabricated, the coherent wave source 110*b* may be fabricated to have a frequency response characteristic that the electrical signal on a higher frequency side relative to the second frequency band is not transmitted. In such a case also, the noise component included in the control signal is reduced.

A graph G3 in FIG. 7 shows one example of a distribution, on a frequency axis, of an amplitude indicated by the frequency spectrum of the third modulated coherent wave. The third modulated coherent wave is a coherent wave having a frequency component in the second frequency band and a frequency component of the non-modulated frequency and is a coherent wave having a frequency component in other frequencies being approximately zero.

The modulator 120b differs from the modulator 120 in that the former executes the main signal overlay processing on the third modulated coherent wave instead of the non-modulated coherent wave. The third modulated coherent wave is incident on the modulator 120b. The modulator 120b executes the main signal overlay processing on the incident third modulated coherent wave to generate the second modulated coherent wave. Specifically, in the main signal overlay processing, the modulator 120b modulates the incident third modulated coherent wave with the main signal to generate the second modulated coherent wave.

The modulator 120b emits the second modulated coherent wave source. The modulator 120b may be any modulator capable of executing the main signal overlay processing on a third modulated coherent wave source. The modulator 120b may be a Mach-Zehnder modulator, may be an electroabsorption modulator, and may be an SOA, for example. Furthermore, the modulator 120b may be integrated on the same substrate (such as an indium phosphide substrate) as the coherent wave source.

The operation of the transmitter 1b is controlled by the control apparatus 2. In the transmission system 100b, a target to be applied with the main signal by the main signal overlay control unit 24 is the modulator 120b. In the transmission system 100b, a target to be applied with the control signal by the control signal overlay control unit 25 is the coherent wave source 110b.

The thus-configured transmitter 1b according to the third embodiment modulates the coherent wave without superimposing the main signal and the control signal. Thus, the transmitter 1b is capable of suppressing deterioration of the SNR of a signal in communication using an electromagnetic wave as a carrier wave.

Note that in a case where the control signal is a signal transmitted through the control signal filter, the noise component of the control signal is suppressed, and thus, compared to a case where the control signal does not pass through the control signal filter, the transmitter 1b is capable of further suppressing the deterioration of the SNR in communication.

Fourth Embodiment

Figure 8:
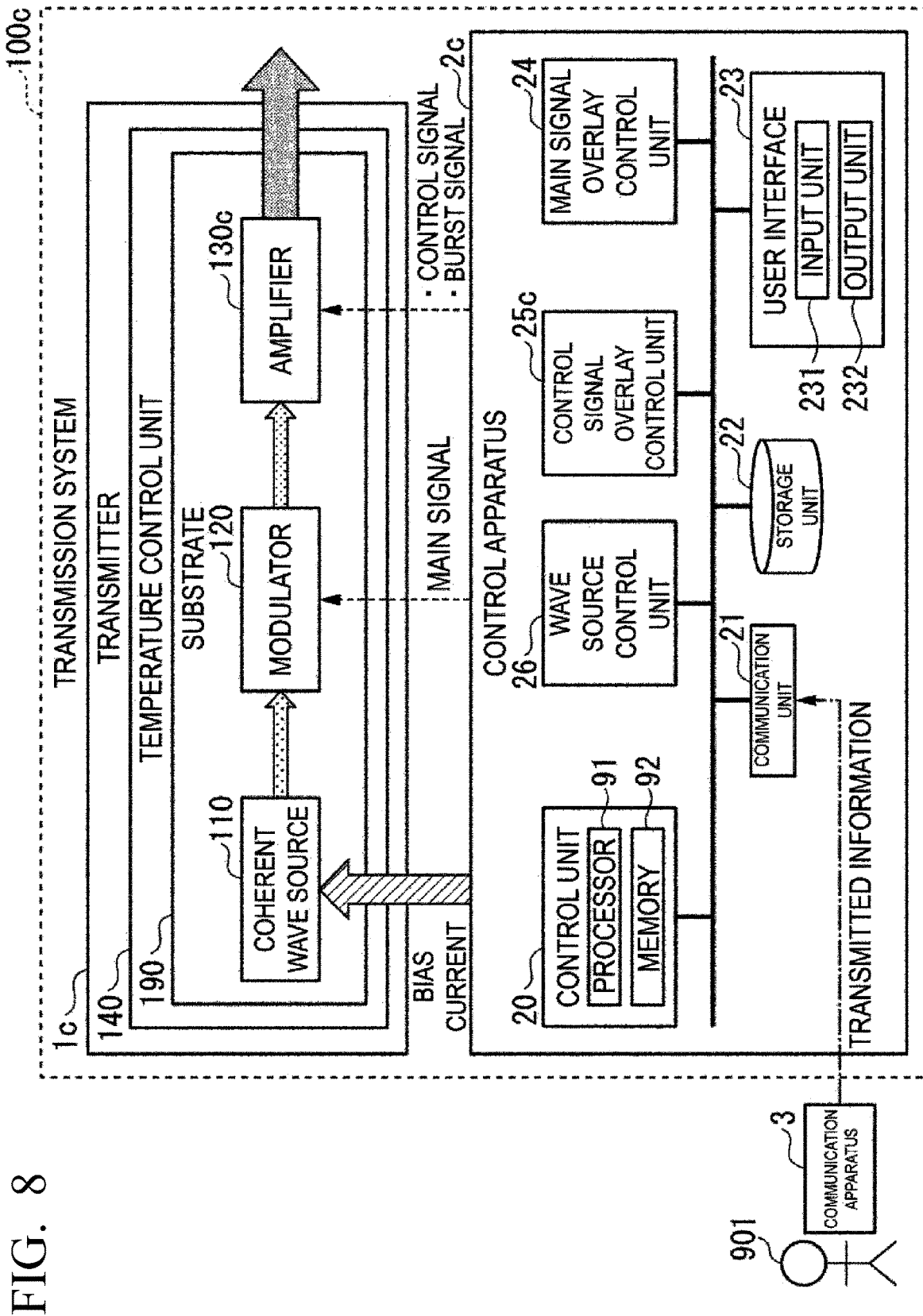
FIG. 8 is a diagram illustrating one example of a functional configuration of a transmission system according to a fourth embodiment.

FIG. 8 is a diagram illustrating one example of a functional configuration of a transmission system 100c according to a fourth embodiment. The transmission system 100c differs from the transmission system 100 in that the former includes a control apparatus 2c instead of the control apparatus 2 and includes a transmitter 1c instead of the transmitter 1. The control apparatus 2c differs from the control apparatus 2 in that the former includes a control signal overlay control unit 25c instead of the control signal overlay control unit 25. The transmitter 1c differs from the transmitter 1 in that the former includes an amplifier 130c instead of the amplifier 130 and includes a temperature control unit 140. Hereinafter, the same reference signs as those in FIG. 4 will be applied to components having similar functions to those of the function units provided in the transmission system 100c, and description thereof will be omitted.

The amplifier 130c is a SOA. The amplifier 130c differs from the amplifier 130 in that the former is applied not only with the control signal but also with a burst signal. The burst signal is a signal for switching on and off of the emission of the second modulated coherent wave by the amplifier 130c. Turning on the emission of the second modulated coherent wave means emitting the second modulated coherent wave. Turning off the emission of the second modulated coherent wave means not emitting the second modulated coherent wave.

The burst signal is an inverse bias current applied to the amplifier 130c. The amplifier 130c applied with the inverse bias current absorbs the incident first modulated coherent wave. Thus, the second modulated coherent wave is not emitted from the amplifier 130c during a period during which the amplifier 130c is applied with the inverse bias current (that is, the burst signal).

Note that a timing of switching on and off of the emission of the second modulated coherent wave may be a previously determined prescribed timing or may be a timing indicated by the sender 901 via the communication unit 21 or the input unit 231.

A cycle for switching on and off of the emission of the second modulated coherent wave by using the burst signal may be any cycle of a frequency not overlapping the first frequency band or the second frequency band and being different from the non-modulated frequency. For example, the cycle for switching on and off of the emission of the second modulated coherent wave by using the burst signal is a cycle of a frequency lower than the second frequency band.

The temperature control unit 140 adjusts a temperature of the coherent wave source 110. The temperature control unit 140 is, for example, a Peltier element. The temperature control unit 140 adjusts the temperatures of the coherent wave source 110, the modulator 120, and the amplifier 130 to suppress changes in oscillation wavelength (that is, a wavelength of the non-modulated coherent wave) due to changes in temperature. The temperature control unit 140 adjusts the temperatures of the coherent wave source 110, the modulator 120, and the amplifier 130 to suppress changes in frequency of the second modulated coherent wave due to changes in temperature occurring at the timing of switching on and off of the emission of the second modulated coherent wave. Note that the changes in oscillation wavelength due to changes in temperature are, for example, 0.1 nm/K in a DFB laser or a DBR laser.

Note that the temperature control unit 140 may control the temperature of the substrate 190 so as to oscillate at a desired wavelength.

The control signal overlay control unit 25c differs from the control signal overlay control unit 25 in that not only the control signal but also the burst signal in addition to the control signal is applied to the amplifier 130. The control signal overlay control unit 25c controls the operation of the amplifier 130c.

The thus-configured transmission system 100c according to the fourth embodiment modulates the coherent wave without superimposing the main signal and the control signal. Thus, the transmission system 100c is capable of suppressing deterioration of the SNR of a signal in communication using an electromagnetic waves as a carrier wave.

The thus-configured transmission system 100c according to the fourth embodiment switches on and off of the emission of the second modulated coherent wave by the transmitter 1c by using the burst signal. The burst signal is a signal applied to the amplifier 130c and does not affect the operation of the coherent wave source 110.

Thus, if the burst signal is used to control turning on and off of the emission of the second modulated coherent wave, the coherent wave source 110 may be applied with the bias current even when the emission of the second modulated coherent wave is turned off (that is, not emitted). That is, if the burst signal is used to control turning on and off of the emission of the second modulated coherent wave, it is not necessary to stop the generation of the coherent wave by the coherent wave source 110 even when the second modulated coherent wave is not emitted.

If switching on and off of the emission of the second modulated coherent wave is performed by processing of applying or not applying the bias current, the oscillation wavelength in the coherent wave source 110 may change at each switching. However, in the transmission system 100c according to the fourth embodiment, it is not necessary to change the operation of the coherent wave source 110 to execute switching on and off of the emission of the second modulated coherent wave. Thus, the transmission system 100c according to the fourth embodiment is capable of decreasing the frequency at which the oscillation wavelength in the coherent wave source 110 changes at each switching.

Application Example

Figure 9:
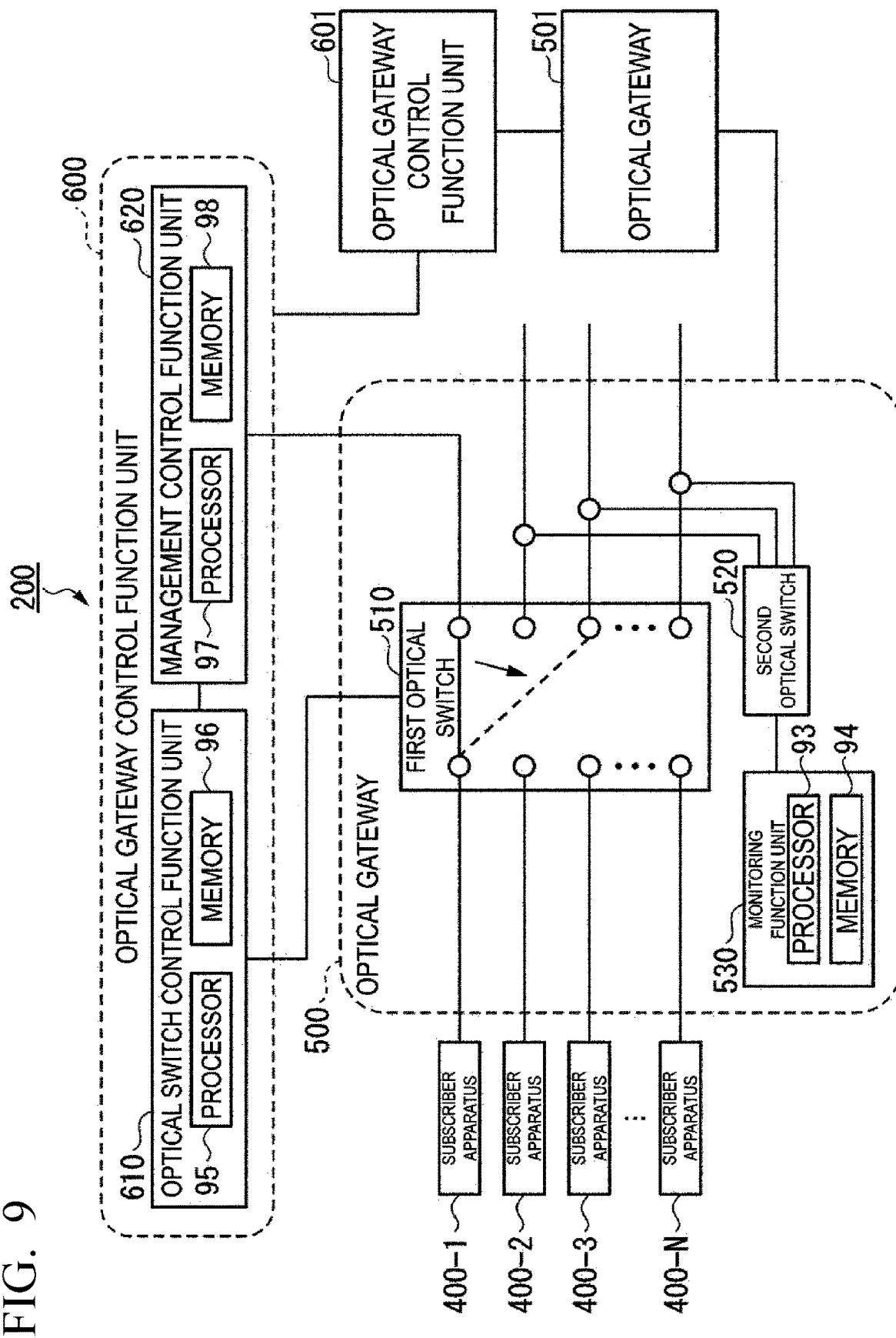
FIG. 9 is a diagram illustrating one example of an application example of the transmission system.

FIG. 9 is a diagram illustrating one example of an application example of the transmission systems 100 to 100c. Hereinafter, for the sake of simplicity, the transmission system 100 according to the first embodiment will be described in an example to provide the application examples of the transmission systems 100 to 100c.

FIG. 9 is a diagram illustrating a functional configuration of a communication system 200 that is an application example of the transmission system 100 according to an embodiment. The communication system 200 includes subscriber apparatuses 400-1 to 400-N (where N is an integer of 2 or greater), an optical gateway 500, and an optical gateway control function unit 600.

The subscriber apparatuses 400-1 to 400-N and a management control function unit include the transmission system 100.

The subscriber apparatuses 400-1 to 400-N is a communication terminal used by a subscriber to transmit transmitted information. The subscriber apparatuses 400-1 to 400-N emit optical signals carrying the transmitted information. The optical signals emitted by the subscriber apparatuses 400-1 to 400-N are the second modulated coherent wave.

A case is described in which a new subscriber first connects to the optical gateway to newly connect the subscriber apparatus 400-1 to a network to perform communication. That is, for the sake of simplicity, the communication system 200 will be described below in an example where the subscriber apparatus 400-1 communicates with a communication destination.

The subscriber apparatus 400-1 is connected to a first optical switch 510 mounted on the optical gateway 500 via an optical fiber. A subscriber apparatus (that is, the subscriber apparatus 400-1) newly connected to the first optical switch 510 is connected to a management control function unit 620 via the optical gateway 500. The optical gateway 500, the first optical switch 510, and the management control function unit 620 will be described in detail below.

A subscriber may input information indicating a new communication partner through the subscriber apparatus 400-1 (hereinafter referred to as "communication reservation information") to the subscriber apparatus 400-1. Note that the communication reservation information may be previously registered with the optical gateway control function unit 600. The optical gateway control function unit 600 will be described in detail below.

The input communication reservation information is included in a part of information indicated by the control signal in the control apparatus 2, and is used to control the control signal overlay processing. Thus, the optical signal emitted by the subscriber apparatus 400-1 carries the communication reservation information. The subscriber apparatus 400-1 also transmits information related to the subscriber apparatus 400-1 (or the subscriber) together as the control signal (that is, as the management information) to the management control function unit 620. Note that the information related to the subscriber apparatus 400-1 (or the subscriber) is, for example, an identifier indicating a name or a unique user.

The optical gateway control function unit 600 determines information related to the control of the subscriber apparatus 400-1 (hereinafter referred to as "control information") such as an optimum wavelength (hereinafter referred to as "control information") used by the subscriber apparatus 400-1 to connect to the communication partner (for example, the subscriber apparatus 400-2) of the subscriber apparatus 400-1. The optical gateway control function unit 600 transmits, as the control signal, the determined control information to the subscriber apparatus 400-1 via the transmission system 100 included in the management control function unit 620. The subscriber apparatus 400-1 receives the control information transmitted from the management control function unit 620, and sets the transmission system 100 to oscillate at a wavelength indicated by the control information.

On the other hand, the optical gateway 500 is instructed, by an optical switch control function unit 610 of the optical gateway control function unit 600, to switch a path of the first optical switch 510 connected with the subscriber apparatus 400-1 from a connected path to another path satisfying a predetermined condition. The other path satisfying the predetermined condition is, for example, a path connecting the subscriber apparatus 400-1 and the communication partner of the subscriber apparatus 400-1. Switching of the path is, for example, switching from a solid line to a dotted line. In accordance with the instruction to switch the path received by the optical gateway 500, the first optical switch 510 switches the path to the instructed path.

Note that if a switching speed condition is satisfied, the first optical switch 510 desirably operates to switch the paths after waiting for a time for switching the wavelengths of the transmission system 100. The switching speed condition is a condition that a time required for the first optical switch 510 to switch the paths is sufficiently faster than a time required to switch the wavelengths of the transmission system 100 in the subscriber apparatus 400-1.

The communication partner of the subscriber apparatus 400-1 is, for example, a distant communication service provider (or another subscriber apparatus). In such a case, the optical gateway 500 is connected to an optical gateway 501. The optical gateway 501 differs in installation location from the optical gateway 500. The optical gateway 501 differs from the optical gateway 500 in that the former is connected to an optical gateway control function unit 601 instead of the optical gateway control function unit 600. The optical gateway 501, which differs in installation location and connection destination from the optical gateway 500, is similar in functions to the optical gateway 500.

The optical gateway control function unit 601 differs in installation location from the optical gateway control function unit 600. The optical gateway control function unit 601 differs from the optical gateway control function unit 600 in that the former is connected to the optical gateway 501 instead of the optical gateway 500. The optical gateway control function unit 601, which differs in installation location and connection destination from the optical gateway control function unit 600, is similar in functions to the optical gateway control function unit 600.

The optical gateway control function unit 600 and the optical gateway control function unit 601 communicate with each other to exchange information (such as an identifier and a wavelength used) relating to a subscriber apparatus connected to each optical gateway control function unit 600.

The optical gateway 500 includes the first optical switch 510, a second optical switch 520, and a monitoring function unit 530. The first optical switch 510 is an optical switch that changes a communication destination of the subscriber apparatus 400. The second optical switch 520 is an optical switch that controls communication between the subscriber apparatus 400 and the monitoring function unit 530.

The monitoring function unit 530 includes a processor 93 such as a CPU and a memory 94 and executes a program. The monitoring function unit 530 executes the program to acquire information indicated by the control signal in each subscriber apparatus 400. Based on the acquired control signal, the monitoring function unit 530 acquires information indicating a communication destination to be communicated at a next timing by the subscriber apparatus 400 from which the control signal is acquired.

The monitoring function unit 530 controls the second optical switch 520, and determines a subscriber apparatus to be monitored from among the subscriber apparatuses 400-1 to 400-N. The monitoring function unit 530 monitors communication of the subscriber apparatus to be monitored not only to monitor the situation but also to detect a failure and the like. The monitoring function unit 530 monitors a control signal transmitted by the subscriber apparatus to be monitored and reads information of a next communication partner to acquire the next communication partner information in advance.

The monitoring function unit 530 controls connection between the subscriber apparatus to be monitored and the management control function unit 620 by executing a program.

The optical gateway control function unit 600 manages communication between the subscriber apparatuses. The optical gateway control function unit 600 includes the optical switch control function unit 610 and the management control function unit 620. The optical switch control function unit 610 includes a processor 95 such as a CPU, and a memory 96, and executes a program. The optical switch control function unit 610 executes the program to control the operations of the first optical switch 510 and the second optical switch 520.

The management control function unit 620 includes a processor 97 such as a CPU, and a memory 98, and executes a program. The monitoring function unit 530 executes the program to control the operation of each function unit included in the communication system 200. The management control function unit 620 controls the operation of the optical switch control function unit 610, for example. The management control function unit 620 controls the operation of the monitoring function unit 530, for example. The management control function unit 620 manages the frequency band of the carrier waves of the optical signal emitted from the subscriber apparatuses 400-1 to 400-N.

Figure 10:
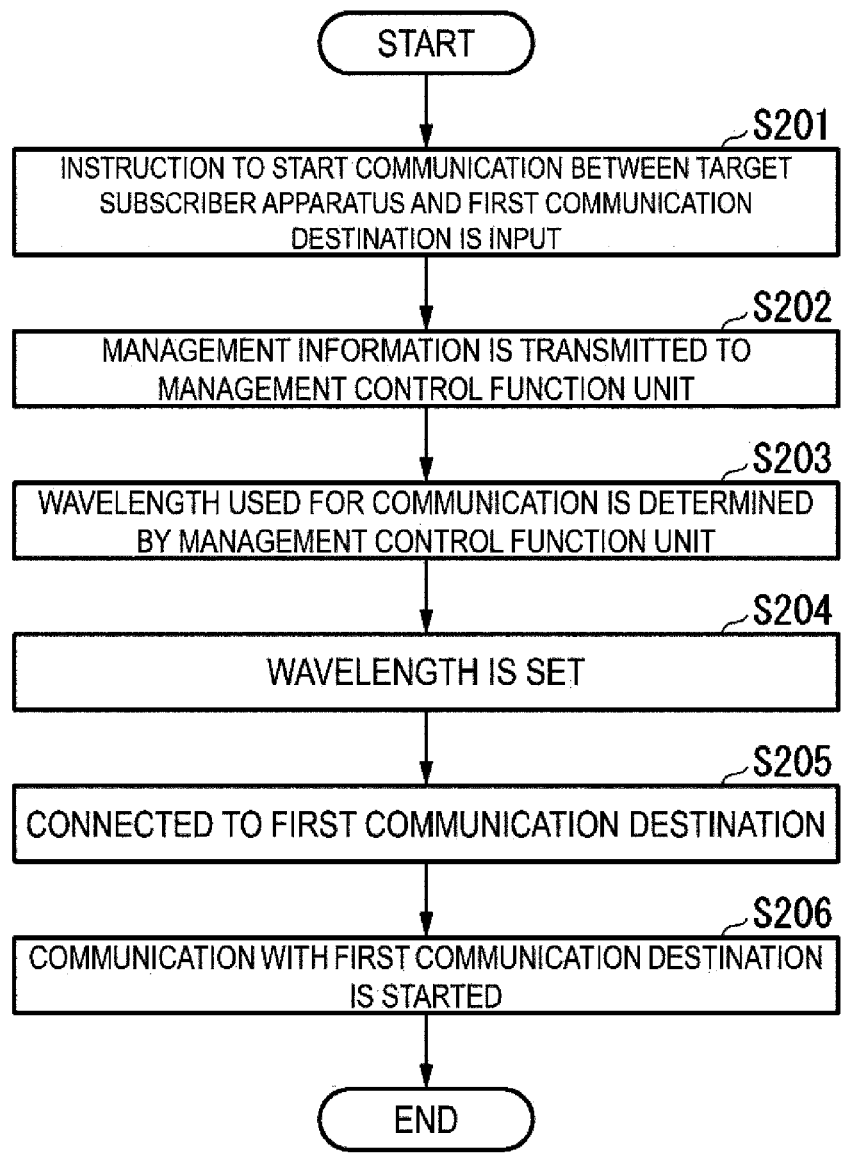
FIG. 10 is a first flowchart illustrating one example of a flow of processing executed by a communication system according to an application example.

FIG. 10 is a first flowchart illustrating one example of a flow of processing executed by the communication system 200 according to the application example. Hereinafter, for ease of simplicity, an operation in a case where a communication destination of one subscriber apparatus 400-1 (hereinafter referred to as "target subscriber apparatus") of the subscriber apparatuses 400-1 to 400-N included in the communication system 200 is changed will be described.

An instruction to start communication with a first communication destination (hereinafter referred to as "first communication destination") is input to the target subscriber apparatus (step S201). The input is performed, for example, on the input unit 231. Next to step S101, the target subscriber apparatus transmits the management information to management control function unit 620 via the first optical switch 510 (step S202). The management information in step S202 includes information of communication start and information of a communication destination. The information of communication start is information indicating that the instruction to start the communication is input to its own apparatus (target subscriber apparatus).

Next, the management control function unit 620 determines the wavelength used for communication between the target subscriber apparatus and the first communication destination, based on the acquired management information (step S203).

Next, the management control function unit 620 controls to set the wavelength according to the first communication destination to the target subscriber apparatus (step S204). The wavelength being set means that the frequency of the carrier wave of the optical signal emitted by the target subscriber apparatus is determined. Next to step S204, the management control function unit 620 controls the optical switch control function unit 610 to switch the first optical switch 510 so that the target subscriber apparatus and the first communication destination are connected (step S205). Next, the communication between the target subscriber apparatus and the first communication destination is started (step S206).

Figure 11:
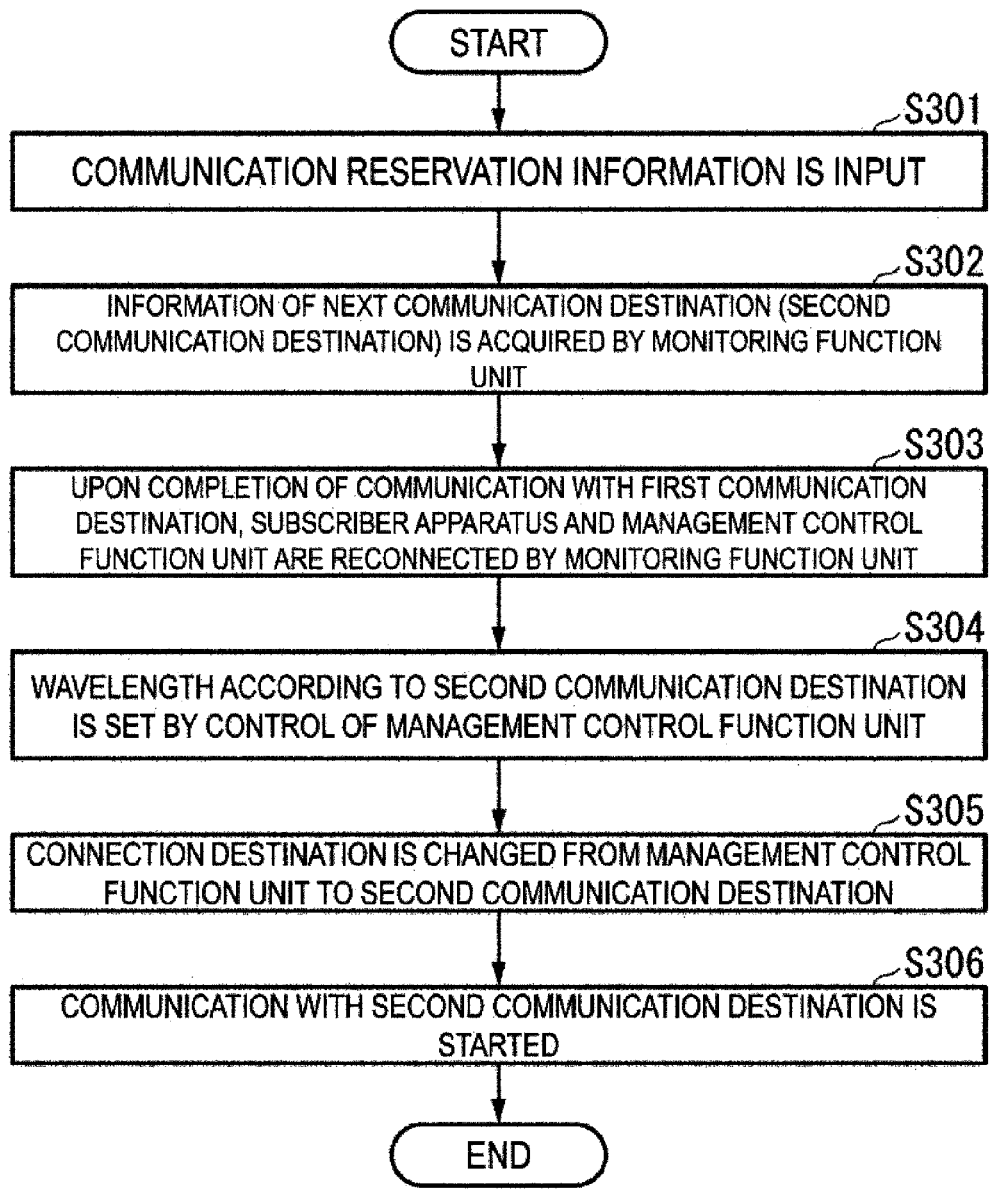
FIG. 11 is a second flowchart illustrating one example of a flow of processing executed by the communication system according to an application example.
Figure 12:
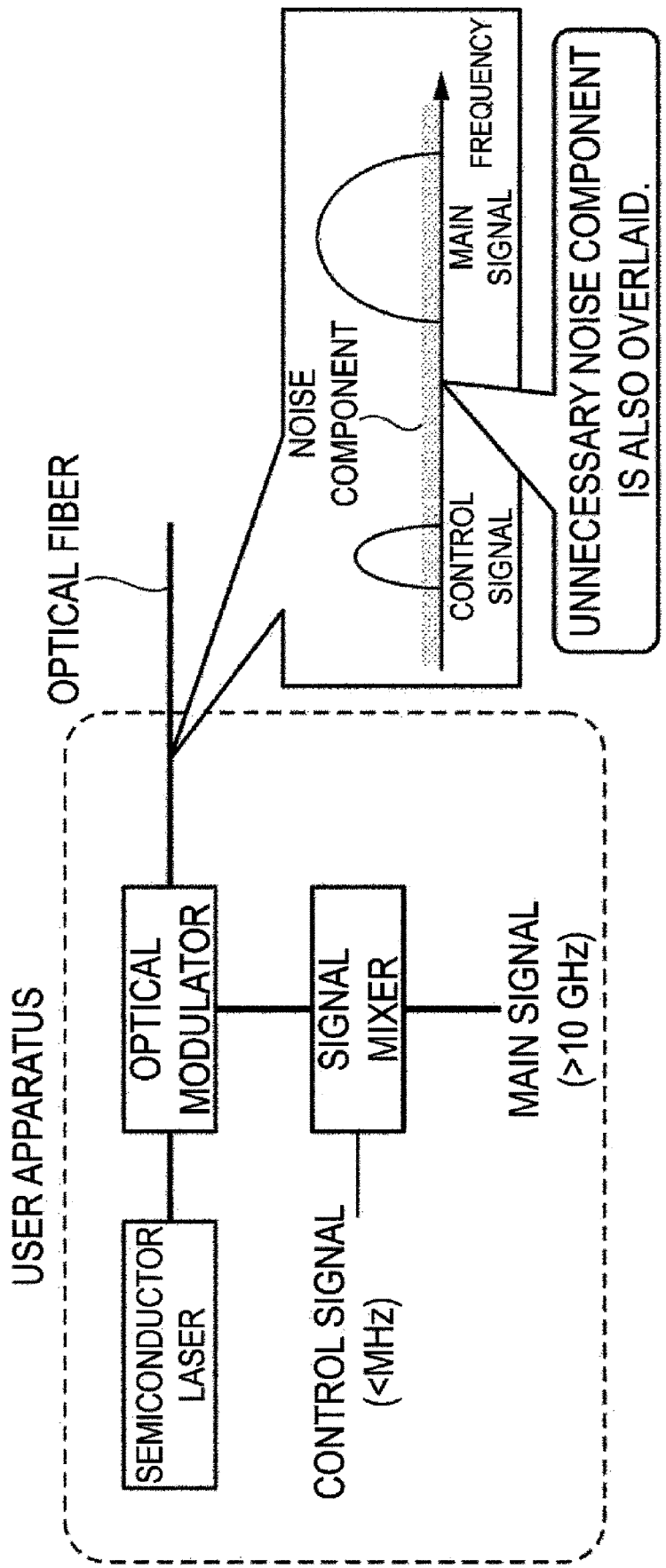
FIG. 12 is an explanatory diagram describing a known communication system.

FIG. 11 illustrates a second flowchart illustrating one example of a flow of processing executed by the communication system 200 according to the application example. The flow of processing illustrated in FIG. 11 is one example of a flow of processing of which execution is started if the target subscriber apparatus is already in communication. More specifically, the flow of processing illustrated in FIG. 11 is one example of a flow of processing of which execution is started if the target subscriber apparatus is in communication with the first communication destination.

In communication with the first communication destination, the communication reservation information indicating a next communication destination (hereinafter referred to as "second communication destination") is input to the target subscriber apparatus (step S301). Next, the monitoring function unit 530 acquires a part of the optical signal emitted by the target subscriber apparatus via the second optical switch to acquire the communication reservation information included in the optical signal (step S302).

At a timing when the communication between the first communication destination and the target subscriber apparatus is completed, the monitoring function unit 530 switches the first optical switch 510 to establish reconnection between the subscriber apparatus and the management control function unit 620 (step S303). Next, the management control function unit 620 controls to set the wavelength according to the second communication destination to the target subscriber apparatus (step S304). Next, the management control function unit 620 controls the optical switch control function unit 610 to switch the first optical switch 510 so that the target subscriber apparatus and the second communication destination are connected (step S305). Next, the communication between the target subscriber apparatus and the second communication destination is started (step S306).

Modified Example

Note that it is not always necessary that the coherent wave source 110, the modulator 120, and the amplifier 130 are located on the same substrate. However, if at least some of the coherent wave source 110, the modulator 120, and the amplifier 130 are located on the same substrate, it is possible to monolithically produce the transmitter 1. When the transmitter 1 is monolithically produced, it is possible to exhibit an effect that the number of steps required for the production is decreased compared to a non-monolithic production method such as a hybrid. When the monolithic production is employed, it is possible to obtain an effect that the transmitter 1 can be reduced in size.

Note that the modulator 120 is one example of a modulated wave generation unit. If the modulator 120 is one example of the modulated wave generation unit, the amplifier 130 is one example of a modulation unit. Note that if the modulator 120 is one example of the modulated wave generation unit, the first modulated coherent wave is one example of an intermediate wave.

Note that the coherent wave source 110*a* is one example of the modulated wave generation unit. If the coherent wave source 110*a* is one example of the modulated wave generation unit, the modulator 120*a* is one example of a modulation unit. If the coherent wave source 110*a* is one example of the modulated wave generation unit, the first modulated coherent wave is one example of an intermediate wave.

Note that the coherent wave source 110*b* is one example of the modulated wave generation unit. If the coherent wave source 110*b* is one example of the modulated wave generation unit, the modulator 120*b* is one example of a modulation unit. If the coherent wave source 110*b* is one example of the modulated wave generation unit, the third modulated coherent wave is one example of an intermediate wave.

Note that the amplifier 130*c* is one example of the modulation unit. Note that the amplifier 130*c* is one example of a burst unit. The optical gateway control function unit 600 is one example of a control function unit.

Note that the main signal filter 201 and the control signal filter 202 are not included in the transmission system only, and may be included in the transmission systems 100*a* to 100*c*.

Note that all or some of the functions in the control apparatuses 2 and 2*c*, the optical gateway 500, and the optical gateway control function unit 600 may be realized using hardware such as an application specific integrated circuit (ASIC), a programmable logic device (PLD), or a field programmable gate array (FPGA). The program may be recorded on a computer-readable recording medium. The computer-readable recording medium is, for example, a portable medium such as a flexible disk, a magneto-optical disk, a ROM, or a CD-ROM, or a storage device such as a hard disk drive incorporated in a computer system. The program may be transmitted via an electrical communication line.

Although the embodiments of the present disclosure have been described in detail with reference to the drawings, a specific configuration is not limited to the embodiments, and a design or the like in a range that does not depart from the gist of the present disclosure is included.

REFERENCE SIGNS LIST

100, 100*a*, 100*b*, 100*c* . . . Transmission system
1, 1*a*, 1*b*, 1*c* . . . Transmitter
2, 2*c* . . . Control apparatus
3 . . . Communication apparatus
110, 110*a*, 110*b* . . . Coherent wave source
120, 120*a*, 120*b* . . . Modulator
130, 130*c* . . . Amplifier
140 . . . Temperature control unit
190 . . . Substrate
20 . . . Control unit
21 . . . Communication unit
22 . . . Storage unit
23 . . . User interface
24 . . . Main signal overlay control unit
25, 25*c* . . . Control signal overlay control unit
26 . . . Wave source control unit
201 . . . Main signal filter
202 . . . Control signal filter
231 . . . Input unit
232 . . . Output unit
91, 93, 95, 97 . . . Processor
92, 94, 96, 98 . . . Memory
200 . . . Communication system
400-1 to 400-N . . . Subscriber apparatus
500, 501 . . . Optical gateway
510 . . . First optical switch
520 . . . Second optical switch
530 . . . Monitoring function unit
600, 601 . . . Optical gateway control function unit
610 . . . Optical switch control function unit
620 . . . Management control function unit
901 . . . Sender

The invention claimed is:

1. A transmission system, comprising:
a modulated wave generator configured to generate an intermediate wave, which is a coherent wave in which a frequency component of either of two signals overlays a frequency spectrum, the two signals being a main signal indicating transmitted information to be transmitted and a control signal indicating management information, which is information on communication between a transmission source of the transmitted information and a communication destination of the transmission source; and
a modulator configured to modulate the intermediate wave with a signal in which a frequency component does not overlay the frequency spectrum of the coherent wave generated by the modulated wave generator out of the two signals that are the main signal and the control signal, wherein a frequency band of the main signal and a frequency band of the control signal do not overlap each other,
wherein the modulator is a semiconductor optical amplifier (SOA), and an inverse bias is applied to the modulator.

2. The transmission system according to claim 1, comprising:
- a coherent wave source configured to generate a non-modulated coherent wave, which is an unmodulated coherent wave, wherein
- the modulated wave generator generates the intermediate wave by modulating the non-modulated coherent wave with the main signal, and
- the modulator modulates the intermediate wave with the control signal.

3. The transmission system according to claim 1, wherein
- the modulated wave generator generates, as the intermediate wave, a coherent wave having a frequency spectrum with a frequency component of the main signal overlaying a frequency spectrum of an unmodulated coherent wave, and
- the modulator modulates the intermediate wave with the control signal.

4. The transmission system according to claim 1, wherein
- the modulated wave generator generates, as the intermediate wave, a coherent wave having a frequency spectrum with a frequency component of the control signal overlaying a frequency spectrum of an unmodulated coherent wave, and
- the modulator modulates the intermediate wave with the main signal.

5. The transmission system according to claim 1, wherein
- the main signal and the control signal are signals transmitted through a filter configured to remove a noise component on a frequency axis.

6. A transmission method, comprising:
- generating an intermediate wave, which is a coherent wave in which a frequency component of either of two signals overlays a frequency spectrum, the two signals being a main signal indicating transmitted information to be transmitted and a control signal indicating management information, which is information on communication between a transmission source of the transmitted information and a communication destination of the transmission source; and
- modulating, by a modulator, the intermediate wave with a signal in which a frequency component does not overlay the frequency spectrum of the coherent wave generated in the generating out of the two signals that are the main signal and the control signal, wherein a frequency band of the main signal and a frequency band of the control signal do not overlap each other,
- wherein the modulator is a semiconductor optical amplifier (SOA), and an inverse bias is applied to the modulator.

7. A communication system, comprising:
- a plurality of communication terminals including a transmission system including a modulated wave generator configured to generate an intermediate wave, which is a coherent wave in which a frequency component of either of two signals overlays a frequency spectrum, the two signals being a main signal indicating transmitted information to be transmitted and a control signal indicating management information, which is information on communication between a transmission source of the transmitted information and a communication destination of the transmission source, and a modulator configured to modulate the intermediate wave with a signal in which a frequency component does not overlay the frequency spectrum of the coherent wave generated by the modulated wave generator out of the two signals that are the main signal and the control signal, and the transmission system having a frequency band of the main signal and a frequency band of the control signal that do not overlap each other, wherein the modulator is a semiconductor optical amplifier (SOA), and an inverse bias is applied to the modulator; and
- a processor; and a computer-readable recording medium having computer program instructions stored thereon, wherein the computer program instructions, when executed by the processor, perform processing of:
- controlling communication among the plurality of communication terminals.

* * * * *